Dec. 8, 1964     D. U. HUNTER     3,160,392
TURBINE WITH VARIABLE NOZZLE
Filed Jan. 5, 1962     3 Sheets-Sheet 1
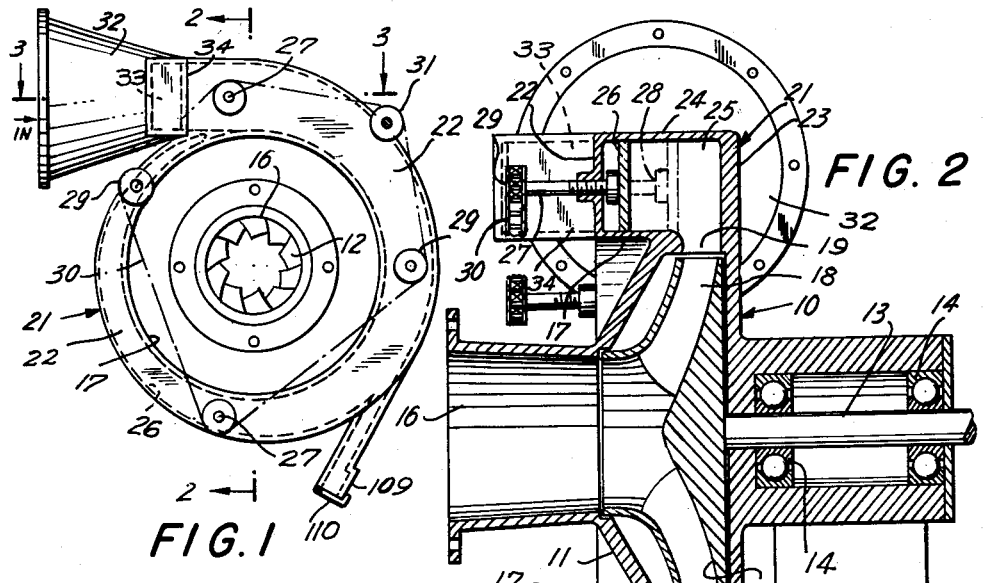
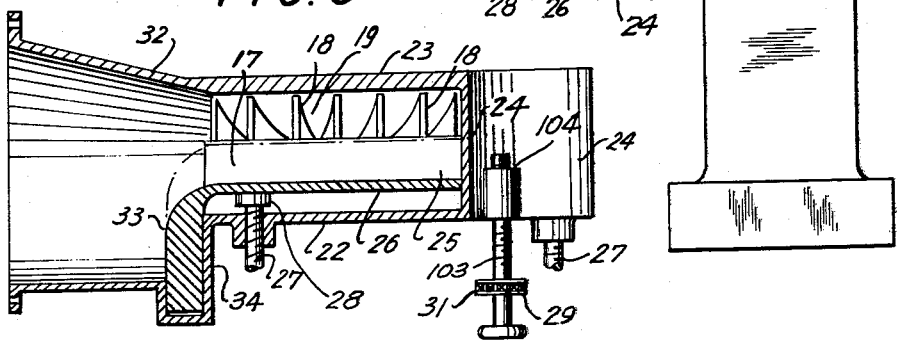
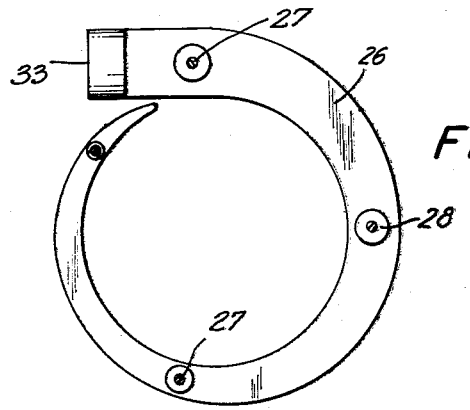
INVENTOR.
DAVID U. HUNTER
BY Clark & Ott
ATTORNEYS

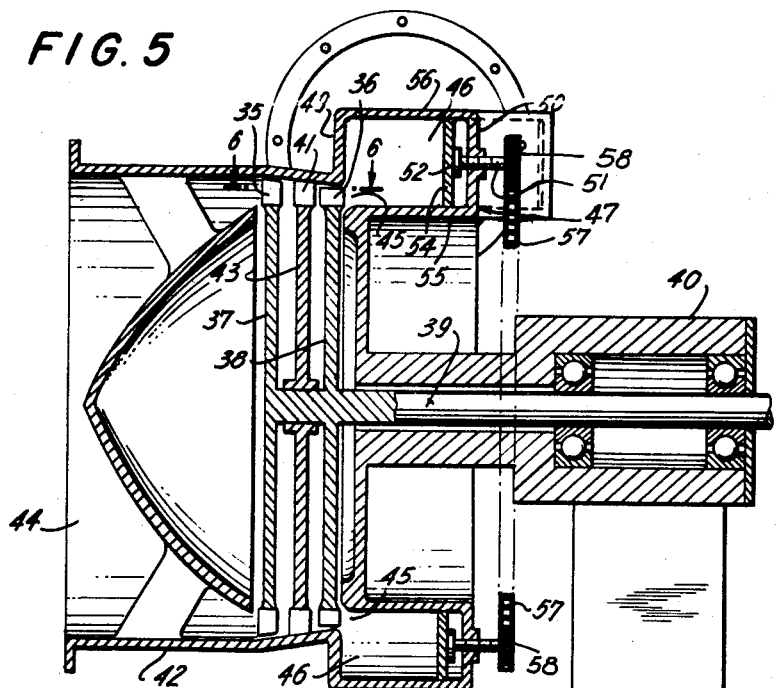
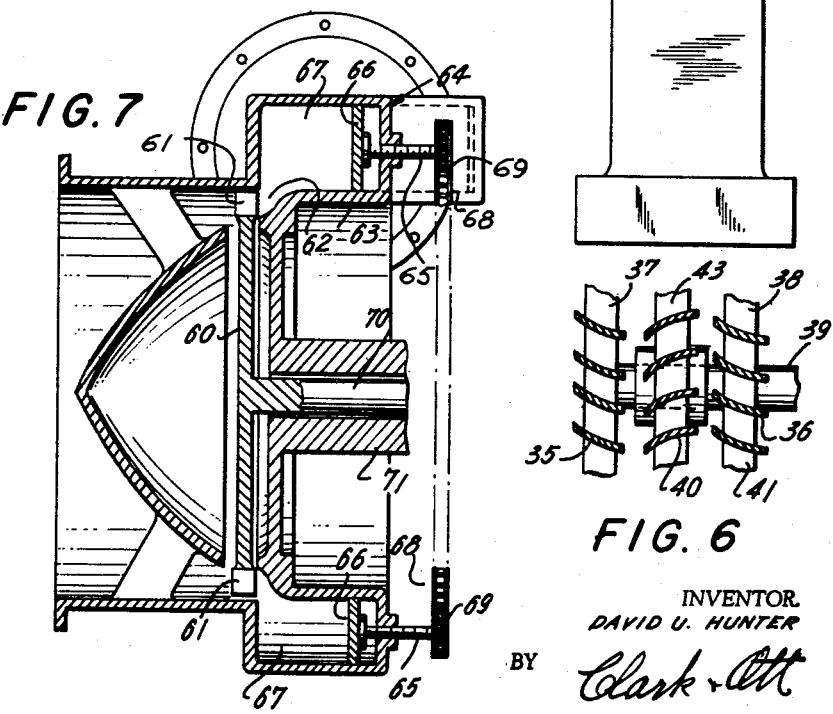

Dec. 8, 1964         D. U. HUNTER              3,160,392
            TURBINE WITH VARIABLE NOZZLE
Filed Jan. 5, 1962                        3 Sheets-Sheet 3
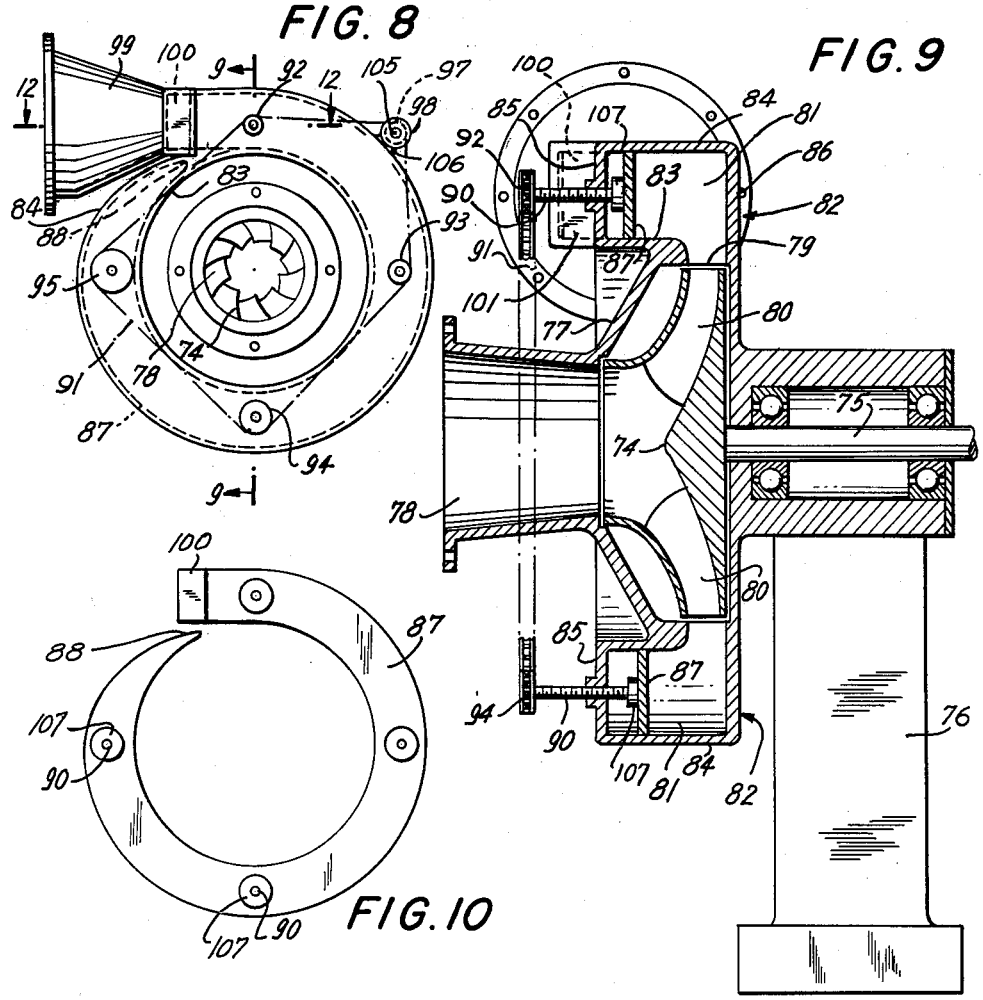
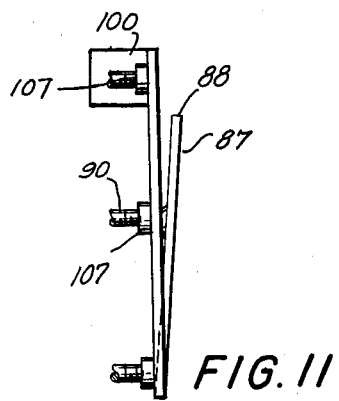
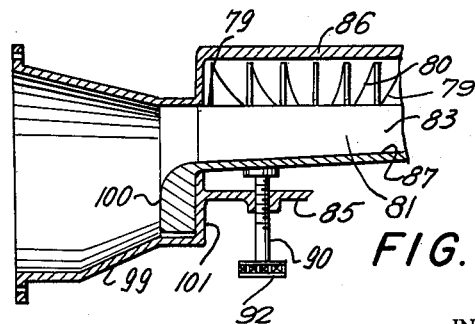
INVENTOR.
DAVID U. HUNTER
BY Clark & Ott
ATTORNEYS United States Patent Office 3,160,392
Patented Dec. 8, 1964

3,160,392
TURBINE WITH VARIABLE NOZZLE
David U. Hunter, 12 Golf Lane, Huntington, N.Y.
Filed Jan. 5, 1962, Ser. No. 164,468
1 Claim. (Cl. 253—52)

This invention relates to a turbine with variable nozzle for varying the operational load output of the turbine wheel.

For efficiency of operation, the flow of the fluid into the turbine wheel should approximate a constant quantity of flow throughout the periphery thereof at each operational load output thereof. Heretofore, a plurality of nozzles have been provided for this purpose which are disposed in circumferentially spaced relation about the periphery of the wheel in close proximity thereto and with a low velocity of flow to the nozzle and a high velocity of flow through the channels from the nozzle to the wheel. This necessitates the adjustment of each of the nozzles for each operational load output and requires a complicated and expensive actuator mechanism for varying the nozzles.

In order to overcome the objections and disadvantages of a plurality of variable nozzles, the present invention has in view a turbine having a variable nozzle for producing a constant quantity of flow of the fluid into the turbine wheel at high velocity throughout the periphery thereof at each operational load output.

Another object of the invention is to provide a turbine with a nozzle having a flow passageway for the fluid which progressively decreases in cross-sectional area about the periphery of the wheel whereby the quantity of flow into the wheel is substantially constant about the periphery thereof and which cross-sectional area is variable throughout the extent of the passageway for varying the operational load output of the wheel with a substantially constant velocity of flow into the wheel throughout the periphery of the wheel at each adjustment of the nozzle.

Still another object of the invention is to provide a nozzle having an accelerating passageway leading into a fluid passageway in the form of a volute which is in close proximity to the wheel and in communication with the wheel housing by a narrow flow passageway whereby a relatively high velocity of flow to the wheel is obtained.

Still another object of the invention is to provide a flow passageway having a slotted annular wall separating the same from the periphery of the wheel and with an outer peripheral wall in the form of a volute to thereby provide a flow passageway of decreasing cross-sectional area throughout the extent thereof, together with means for varying the cross-sectional area throughout the extent thereof for varying the operational load output of the wheel.

Still another object of the invention is to provide a variable nozzle of said character having means for removing debris to prevent the same from entering the nozzle wheel and for preventing the erosion of parts of the turbine caused by deflection of foreign material in the fluid.

Another object of the invention is to provide a variable turbine nozzle which also functions as a shut off valve.

With the foregoing and other objects in view, reference is now made to the following specification and accompanying drawings in which the preferred embodiments of the invention are illustrated.

In the drawings:

FIG. 1 is a view in elevation of a steam turbine provided with a variable nozzle constructed in accordance with the invention.

FIG. 2 is a vertical sectional view taken approximately on line 2—2 of FIG. 1.

FIG. 3 is a horizontal sectional view taken approximately on line 3—3 of FIG. 1.

FIG. 4 is a view in side elevation of the slide plate.

FIG. 5 is a vertical sectional view of a steam turbine provided with a modified form of variable nozzle constructed in accordance with the invention.

FIG. 6 is an enlarged fragmentary sectional view taken approximately on line 6——6 of FIG. 5.

FIG. 7 is a vertical sectional view of a steam turbine provided with another form of variable nozzle constructed in accordance with the invention.

FIG. 8 is a view in elevation of a steam turbine provided with still another form of variable nozzle constructed in accordance with the invention.

FIG. 9 is an enlarged vertical sectional view taken approximately on line 9—9 of FIG. 8.

FIG. 10 is a face view of the adjustable plate for varying the operational output of the turbine.

FIG. 11 is an edge view thereof.

FIG. 12 is an enlarged fragmentary sectional view taken approximately on line 12—12 of FIG. 8.

Referring to the drawings and more particularly to FIGS. 1 to 4 thereof, the turbine 10 may be of any desired construction and, as illustrated, the same consists of a housing 11 within which is mounted a turbine wheel or rotor 12 affixed to a shaft 13 which is journaled for rotation in bearings 14 supported by a pedestal 15 and with the shaft protruding from the bearings for operationally connecting the same to equipment to be rotated by the wheel. The housing 11 has a fluid discharge outlet 16 and a peripheral wall 17 located in close proximity to the ends of the blades 18 of the wheel which wall is provided with a slot 19 extending continuously about the wheel and constituting a fluid inlet.

In order to provide means for varying the operational load output of the wheel and for the flow of fluid at a constant velocity thereabout, a peripheral casing 21 extends peripherally about the housing 11. The casing 21 is preferably of rectangular shape in cross-section and decreases proportionately from one end thereof throughout the extent of the peripheral wall 17. As illustrated, the peripheral casing 21 includes parallel side walls 22 and 23 connected in any desired manner with the peripheral wall 17 and with an outer peripheral wall 24 in the form of a volute. The peripheral casing 21 permits of the unrestricted flow of fluid at constant and relatively high velocity throughout the flow passageway 25 therein since the cross-sectional area thereof decreases proportionate to the flow of the fluid into the wheel through the slot 19. The peripheral casing 21 thus constitutes a nozzle for the flow of the fluid to the turbine wheel.

The cross-sectional area of the flow passageway is variable by means of an adjustable plate 26 arranged to extend from one end thereof to the other and which is mounted for lateral sliding movement to restrict the cross-sectional area throughout the extent of the passageway. The adjustable plate 26 has curved inner and outer edges corresponding to the curvature of peripheral walls 17 and 24 of the housing and casing respectively which snugly and slidably engages the said walls. The said plate is adapted to be moved laterally to vary the cross-sectional area of the flow passageway by any desired means. A plurality of screws 27 threadedly engaging in threaded openings in the side wall 22 of the peripheral casing 21 may be provided for this purpose with the inner ends of the screws connected with the plate by ball and socket connections 28 for swivel turning movement and with the outer ends of the screws disposed in protruding relation for turning thereof by any desired means. As illustrated, the outer end of each of the screws 27 may be provided with sprockets 29 around which is trained a sprocket chain 30 and which is also trained over a drive sprocket 31 having a handle affixed to the outer end thereof for manually rotating the drive sprocket and the several screws in unison.

The casing 21 is adapted to be connected with any desired source of fluid under pressure for driving the turbine wheel and preferably the casing is provided with a frusto-conical forward section 32 which tapers towards the casing for accelerating or increasing the velocity of the flow of the fluid, so that the fluid is at relatively high velocity on entering the casing. The adjustable plate 26 is provided with a laterally extending offset portion 33 at the forward end thereof which overlies the offset portion 34 of the forward section 32, and confines the flow of the fluid from the forward section into the flow passageway 25 between the adjustable plate 26 and the wall 23 of the casing. This offset portion 34 also cuts off the flow of the fluid into the flow passageway 25 when the adjustable plate 26 is moved against the wall 23 to thereby shut off the flow of the fluid into the turbine.

The invention is also applicable to turbines of the type shown in FIGS. 5, 6 and 7 of the drawings. In the form shown in FIGS. 5 and 6 of the drawings, the turbine is of the type having circumferentially spaced blades 35 and 36 mounted on the periphery of spaced turbine wheels 37 and 38 respectively which are affixed to the turbine shaft 39. The said shaft is journaled for rotation in a pedestal 40 and with one end of the shaft protruding therefrom for operatively connecting the same to equipment to be rotated by the turbine. Arranged between the blades 35 and 36 are circumferentially spaced blades 41 affixed to the housing 42 and to a fixed disc 43 located between the wheels 37 and 38 and which is centrally apertured to secure the shaft for relative rotation thereof. The housing 42 provides a fluid outlet 44 and a fluid inlet 45 from a flow passageway 46 provided by a peripheral casing 47 which is of preferably rectangular shape in cross-section and decreasing proportionately about the turbine wheels similar to the flow passageway 25 in the previous form of the invention. In this form, however, the inlet to the blades consists of the narrow slot 45 in the annular wall 49 of the casing 47 and the opposite annular wall 50 thereof is provided with a plurality of circumferentially spaced screws 51 threadedly engaging openings therein and which are connected by ball and socket connections 52 with an adjustable plate 54 similar to the adjustable plate 26 in the previous form of the invention. In this form also the wall 55 of the casing 47 is of annular formation while the opposite wall 56 thereof is in the form of a volute similar to the wall 24 of the casing 21. The screws 51 may be rotated in unison in any desired manner such as by a sprocket chain 57 operating over sprockets 58 affixed to the screws 51 similar to the sprocket chain 32 for moving the adjustable plate inwardly towards the wall 49 for reducing the quantity of the flow of the fluid through the flow passageway 46 to thereby vary the operational output of the turbine.

In the form of the invention shown in FIG. 7 of the drawings, the turbine is provided with a single turbine wheel 60 having circumferentially spaced blades 61 on the periphery thereof similar to the turbine wheel 38 shown in FIGS. 5 and 6 of the drawings and the inlet to the turbine wheel in this form is through a narrow slot 62 in the annular wall 63 of the casing 64. The casing 64 is similar in other respects to the casing 47 in the form shown in FIGS. 5 and 6 of the drawings and screws 65 are provided for effecting movement of an adjustable plate 66 in a flow passageway 67 for varying the quantity of the flow of the fluid therein to thereby vary the operational output of the turbine. The screws 65 may be rotated in unison in any desired manner such as by a sprocket chain 68 operating over sprockets 69 as in the previous forms of the invention. The turbine wheel 60 is affixed to a shaft 70 mounted for turning movement in a pedestal 71.

Instead of the flow passageway leading to the turbine being in the form of a volute, for decreasing the quantity of flow of the fluid proportionately throughout the extent of the turbine wheel, the flow passageway may be of annular formation throughout and an annular adjustable wall may be provided in the flow passageway in angular relation to the annular axis thereof for varying the cross-sectional area of the passageway proportionately throughout the extent of the periphery of the turbine wheel as shown in FIGS. 8 to 11 inclusive of the drawings. As illustrated therein, the turbine includes a turbine wheel or rotor 74, affixed to a shaft 75 which is journaled for rotation in a pedestal 76. The turbine wheel or rotor is mounted for rotation within a housing 77 having a fluid outlet 78 and a fluid inlet in the form of a slot 79 located in close proximity to the ends of the blades 80 of the turbine wheel or rotor. In this form of the invention, the slot 79 leads from a fluid passageway 81 formed by a peripheral casing 82. The casing 82 includes inner and outer annular walls 83 and 84 and front and rear side walls 85 and 86 with the slot opening into the turbine wheel through the inner annular wall 83.

In order to provide means for varying the quantity of flow of the fluid in the passageway 81 so as to vary the operational output of the turbine, an adjustable plate 87 is provided which extends from the inlet end of the casing throughout the extent of the flow passageway and terminating as at 88 to thereby form substantially a complete annulus. The said plate is slidable with reference to the inner and outer walls 83 and 84 of the casing and is movable towards and away from the side wall 86 to different set portions for varying the quantity of flow of the fluid in the flow passageway to thereby vary the operational output of the turbine. The adjustable plate 87 is disposed at an angle to the side wall 86 so that said plate constitutes one of the walls of the flow passageway and the flow passageway decreases proportionately from the inlet end thereof to the remote end 88. The peripheral casing 82 permits of the unrestricted flow of the fluid at a constant and relatively high velocity throughout the flow passageway since the cross-sectional area thereof decreases proportionately to the flow of the fluid into the wheel through the slot 79. As in the other forms of the invention, a plurality of circumferentially spaced screws 90 are connected with the adjustable plate 87 by ball and socket connections 107 which protrude through threaded openings in the side wall 85 and with a sprocket chain 91 operating over sprockets 92, 93, 94 and 95 affixed to the outer ends of said screws respectively for adjusting the plate so as to vary the operational output of the turbine. In this form, however, the said sprockets progressively increase in diameter from the inlet end of the casing to the remote end thereof whereby the extent of movement of the adjustable plate 87 varies throughout the extent of the flow passageway. This provides means by which the cross-sectional area decreases proportionately from the inlet end of the casing to the remote end thereof and the casing thus constitutes a nozzle for the flow of fluid to the turbine wheel.

The sprocket chain 91 operates over a drive pulley 97 mounted on the casing 82 and with a handle 98 affixed thereto for manual rotation thereof for effecting rotation of the screws. In this form, also, the casing is provided with a frusto-conical forward section 99 adapted to be connected to any source of fluid under pressure for driving a turbine wheel and which section tapers towards the casing for accelerating or increasing the velocity of the flow of the fluid. The adjustable plate 87 is also provided with a laterally extending offset portion 100 at the forward end thereof which overlies the offset portion 101 of the accelerating section. This provides means for confining the flow of the fluid into the flow passageway with the movement of the adjustable plate toward the rear wall 86.

In the several forms of the invention the drive sprockets preferably move axially proportionately to the axial movement of the screws. For this purpose, the drive sprocket 31 in the form of the invention illustrated in FIGS. 1 to 4 of the drawings is affixed to the outer end of a screw 103 having a threaded shank corresponding to the threaded shanks of the screws 27 and which threadedly engages a bracket 104 mounted on the periphery of the casing 21. This arrangement maintains the endless sprocket chain 30 in a common plane since the screws move equally inwardly and outwardly with the manual turning of the drive shaft. Similarly, the sprocket chain 57 engages over a drive sprocket mounted on the periphery of the casing (not shown) with a handle affixed to the drive sprocket for manually turning the same for effecting equal axial movement of the screws 51. However, in the form of the invention illustrated in FIGS. 8 to 11 of the drawings the sprockets 92, 93, 94 and 95 progressively increase in diameter and rotate at slower speeds whereby the extent of axial movement of the screws 90 lessens proportionately from the inlet end thereof to the remote end thereof. To accommodate this axial movement, the drive pulley 97 is mounted on a screw 105, the thread of which has a pitch substantially mid-way between the pitches of the screws mounting the sprockets 92 and 93. The screw 105 threadedly engages a bracket 106 mounted on the periphery of the casing 82. This provides means by which the endless sprocket chain 91 is maintained in substantially a common plane with the movements of the several screws.

The outer wall 24 of the housing 26 in the form of the invention illustrated in FIGS. 1 to 4 of the drawings is in the form of a logarithmic spiral between the inlet end of the flow passageway 25 and the remote end thereof whereby the flow passageway decreases proportionately throughout the extent thereof. The outer walls of the housing 42 and 64 are also in the form of logarithmic spirals so that the flow passageways 46 and 67 decrease proportionately from the inlet ends thereof to the remote ends respectively.

The housings in the several forms may be provided with pockets such as the pocket 109 in the outer wall 24 of the housing 26 for receiving debris flowing with the fluid and which will be thrown outwardly by the flow of the fluid through the passageway 25 and become entrapped in the pocket. The pocket is provided with a hinged section 110 which may be open for discharging the debris therefrom.

It will be understood that in the several forms of the invention the inlets to the turbine wheels are in the form of continuous annular slots which open into the turbine wheel housing adjacent the turbine blades.

While the preferred forms of the invention are shown and described herein, it is to be understood that the same is not so limited but shall cover any and all modifications of the invention which fall within the purview thereof.

What is claimed is:

In a turbine, a housing having a peripheral wall provided with a slot extending thereabout and forming a fluid inlet into said housing, a turbine wheel mounted for rotation within said housing with the blades of the wheel located in close proximity to said slot, a casing mounted on said housing in overlying relation with said slot providing a flow passageway for the fluid and having an admission inlet for the fluid which is discharged against said wheel through said slot, a forward section tapering toward and connected with said casing and constituting a nozzle for accelerating the velocity of flow of the fluid into the flow passageway, a partition wall arranged in said casing extending coextensive thereof and having an end portion extending into the inner end of said forward section, said partition wall slidably engaging against opposite wall portions of said casing and said forward section, and means extending into said casing into engagement with said partition wall for moving said partition wall to simultaneously vary the cross-sectional area of said flow passageway and the inner end of said forward section.

References Cited in the file of this patent

UNITED STATES PATENTS

| | | |
|---|---|---|
| 1,604,328 | Walker | Oct. 26, 1926 |
| 2,285,976 | Huitson | June 9, 1942 |
| 2,372,518 | Robinson | Mar. 27, 1945 |
| 2,459,519 | Graham et al. | Jan. 18, 1949 |
| 2,578,785 | Davis | Dec. 18, 1951 |
| 2,739,782 | White | Mar. 27, 1956 |
| 2,827,261 | Parker | Mar. 18, 1958 |
| 3,032,259 | Jassniker | May 1, 1962 |

FOREIGN PATENTS

| | | |
|---|---|---|
| 133,892 | Switzerland | Sept. 16, 1929 |
| 1,093,003 | France | Nov. 17, 1954 |